United States Patent
Zhang

(10) Patent No.: US 9,455,625 B2
(45) Date of Patent: Sep. 27, 2016

(54) SWITCHING CONVERTER WITH SLOPE COMPENSATION CIRCUIT

(71) Applicant: Chengdu Monolithic Power Systems Co., Ltd., Chengdu (CN)

(72) Inventor: Bo Zhang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 104 days.

(21) Appl. No.: 14/192,762

(22) Filed: Feb. 27, 2014

(65) Prior Publication Data

US 2014/0239934 A1 Aug. 28, 2014

(30) Foreign Application Priority Data

Feb. 27, 2013 (CN) .......................... 2013 1 0061989

(51) Int. Cl.
*H02M 3/156* (2006.01)
*H02M 1/00* (2006.01)

(52) U.S. Cl.
CPC ..... *H02M 3/156* (2013.01); *H02M 2001/0025* (2013.01)

(58) Field of Classification Search
CPC .................. H02M 3/04; H02M 3/156; H02M 2001/0025
See application file for complete search history.

(56) References Cited

U.S. PATENT DOCUMENTS

| | | | |
|---|---|---|---|
| 2004/0066239 A1* | 4/2004 | Mariani | G01R 23/09 331/16 |
| 2009/0128112 A1* | 5/2009 | Xu | H02M 3/156 323/282 |
| 2010/0090758 A1* | 4/2010 | Lu | H03H 11/1291 327/554 |
| 2010/0181983 A1* | 7/2010 | Ouyang | H02M 3/156 323/283 |
| 2013/0002223 A1 | 1/2013 | Xi | |
| 2013/0257399 A1 | 10/2013 | Jiang | |
| 2014/0043008 A1* | 2/2014 | Babazadeh | G05F 3/02 323/304 |

* cited by examiner

*Primary Examiner* — Jue Zhang
*Assistant Examiner* — Lakaisha Jackson
(74) *Attorney, Agent, or Firm* — Perkins Coie LLP

(57) ABSTRACT

A switching converter with slope compensation circuit, the slope compensation circuit has a first voltage source, a first operation circuit, a first switch, a first capacitor, a second switch and a first controlled current source.

20 Claims, 12 Drawing Sheets

SWITCHING CONVERTER WITH SLOPE COMPENSATION CIRCUIT

CROSS-REFERENCE TO RELATED APPLICATION(S)

This application claims priority to and the benefit of Chinese patent application No. 201310061989.2, filed on Feb. 27, 2013, which is incorporated herein by reference in its entirety.

TECHNICAL FIELD

The present invention generally relates to electronic apparatuses, and more particularly but not exclusively to switching converters.

BACKGROUND

Switching power converters are widely used due to their high efficiency and simple internal structure. Many control modes could be used to control switching power converters, such as constant on time control mode, peak current control mode, and average current control mode. Among these control modes, constant on time control mode is getting more and more popular per its fast transient response, simple structure and smooth switch of operation mode.

FIG. 1 schematically illustrates a conventional constant on time converter 100. The constant on time converter 100 comprises an on time control circuit 101, a comparing circuit 102, a logic circuit 103 and a switching circuit 104. Switching circuit 104 comprises a power switch. The switching circuit 104 is configured to provide an output voltage VOUT from an input voltage VIN via turning the power switch ON and OFF. The on time control circuit 101 is configured to provide an on time period control signal COT to control an on time period of the power switch. The comparing circuit 102 comprises an output terminal configured to provide a comparing signal SET via comparing the output voltage VOUT with a reference signal VREF. The logic circuit 103 comprises a first input terminal coupled to the output terminal of the comparing circuit 102 to receive the comparing signal SET, a second input terminal coupled to the on time control circuit 101 to receive the on time period control signal COT, and an output terminal coupled to a control terminal of the power switch to provide a control signal CTRL.

When an equivalent series resistance (ESR) of an output capacitor in the switching circuit 104 is small, a sub-harmonic oscillation may occur at output voltage VOUT, and constant on time converter 100 may be unstable. A slope compensation circuit 105 may be employed to avoid the sub-harmonic oscillation. The slope compensation circuit 105 comprises an output terminal configured to provide a slope compensation signal VSLOPE. The comparing circuit 102 is configured to provide the comparing signal SET via comparing a sum of the slope compensation signal VSLOPE and the output voltage VOUT with the reference signal VREF.

To ensure that the switching converter 100 is maintained stable under different status, the slope of the slope compensation signal VSLOPE should be sufficiently large, e.g. greater than a critical value that may be determined by a switching frequency, a duty cycle and an output capacitor. As a result, transient response of the converter 100 would be degenerated if the slope of the slope compensation signal VSLOPE is too high. Worse, when the input voltage VIN or a load current IOUT changes, the output voltage VOUT would also be changed if the slope of the slope compensation signal VSLOPE is maintained constant, so as to affect line regulation of the switching converter 100 that indicates the stability of output voltage versus input voltage, or load regulation of the switching converter 100 that indicates the stability of output voltage versus load current. So, it is very important to design slope compensation circuits to adjust the slope of the slope compensation signal VSLOPE. The slope may be adjusted according to one or more following factors: switching frequency of the power switch; duty cycle of the power switch; output capacitors; the input voltage VIN; output voltage VOUT; and the load current IOUT.

SUMMARY

Embodiments of the present invention are directed to a slope compensation circuit, comprising: a first voltage source, having a first terminal and a second terminal, wherein the first voltage source is configured to provide a first voltage signal; a first operation circuit, having a first terminal, a second terminal and an output terminal, configured to provide a current control signal according to the first voltage signal and a second voltage signal; a first switch, having a first terminal and a second terminal, wherein the first terminal of the first switch is coupled to the first terminal of the first voltage source; a first capacitor, having a first terminal and a second terminal, wherein the first terminal of the first capacitor is coupled to the second terminal of the first switch, and wherein the second terminal of the first capacitor is coupled to the second terminal of the first voltage source; a second switch, having a first terminal and a second terminal, wherein the first terminal of the second switch is coupled to the first terminal of the first capacitor; and a first controlled current source, having a first terminal, a second terminal and a control terminal, wherein the first terminal of the first controlled current source is coupled to the second terminal of the second switch, and wherein the second terminal of the first controlled current source is coupled to the second terminal of the first capacitor, and wherein the control terminal of the first controlled current source is coupled to the output terminal of the first operation unit, and wherein the first controlled current source is configured to provide a first current signal according to the current control signal.

Furthermore, there has been provided, in accordance with an embodiment of the present invention, a switching converter, comprising: a switching circuit, having an input terminal, an output terminal and at least one power switch, the switching circuit being configured to provide an output voltage; an on-time control circuit configured to generate an on-time control signal; a slope compensation circuit configured to generate a slope compensation signal, wherein the slope compensation circuit comprise: a first voltage source, having a first terminal and a second terminal, wherein the first voltage source is configured to provide a first voltage signal; a first operation circuit, having a first terminal, a second terminal and an output terminal, configured to provide a current control signal according to the first voltage signal and a second voltage signal; a first switch, having a first terminal and a second terminal, wherein the first terminal of the first switch is coupled to the first terminal of the first voltage source; a first capacitor, having a first terminal and a second terminal, wherein the first terminal of the first capacitor is coupled to the second terminal of the first switch, and wherein the second terminal of the first capacitor is coupled to the second terminal of the first voltage source;

a second switch, having a first terminal and a second terminal, wherein the first terminal of the second switch is coupled to the first terminal of the first capacitor; and a first controlled current source, having a first terminal, a second terminal and a control terminal, wherein the first terminal of the first controlled current source is coupled to the second terminal of the second switch, and wherein the second terminal of the first controlled current source is coupled to the second terminal of the first capacitor, and wherein the control terminal of the first controlled current source is coupled to the output terminal of the first operation unit, and wherein the first controlled current source is configured to provide a first current signal according to the current control signal a comparing circuit coupled to the slope compensation circuit and the switching circuit, wherein the comparing circuit generates a comparing signal according to the slope compensation signal, a reference signal and the output voltage of the switching circuit; and a logic circuit coupled to the on-time control circuit and the comparing circuit, wherein the logic circuit generates a control signal according to the on-time control signal and the comparing signal, and wherein the control signal determines the ON and OFF operation of at least one power switch.

There has been provided, in accordance with another embodiment of the present invention, a constant ON-time switching converter, comprising: a switching circuit, having an input terminal, an output terminal and at least one power switch, the switching circuit being configured to provide an output voltage; an on-time control circuit configured to generate an on-time control signal; a slope compensation circuit configured to generate a slope compensation signal according to an OFF time of the power switch, wherein a slope of the slope compensation signal increases, if: the input voltage decreases; or the load current of the switching converter increases; a comparing circuit coupled to the slope compensation circuit and the switching circuit, wherein the comparing circuit generates a comparing signal according to the slope compensation signal, a reference signal and the output voltage of the switching circuit; and a logic circuit coupled to the on-time control circuit and the comparing circuit, wherein the logic circuit generates a control signal based on the on-time control signal and the comparing signal, and wherein the control signal determines the ON and OFF operation of at least one power switch.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments. These drawings are not necessarily drawn to scale. The relative sizes of elements illustrated by the drawings may differ from the relative size depicted.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
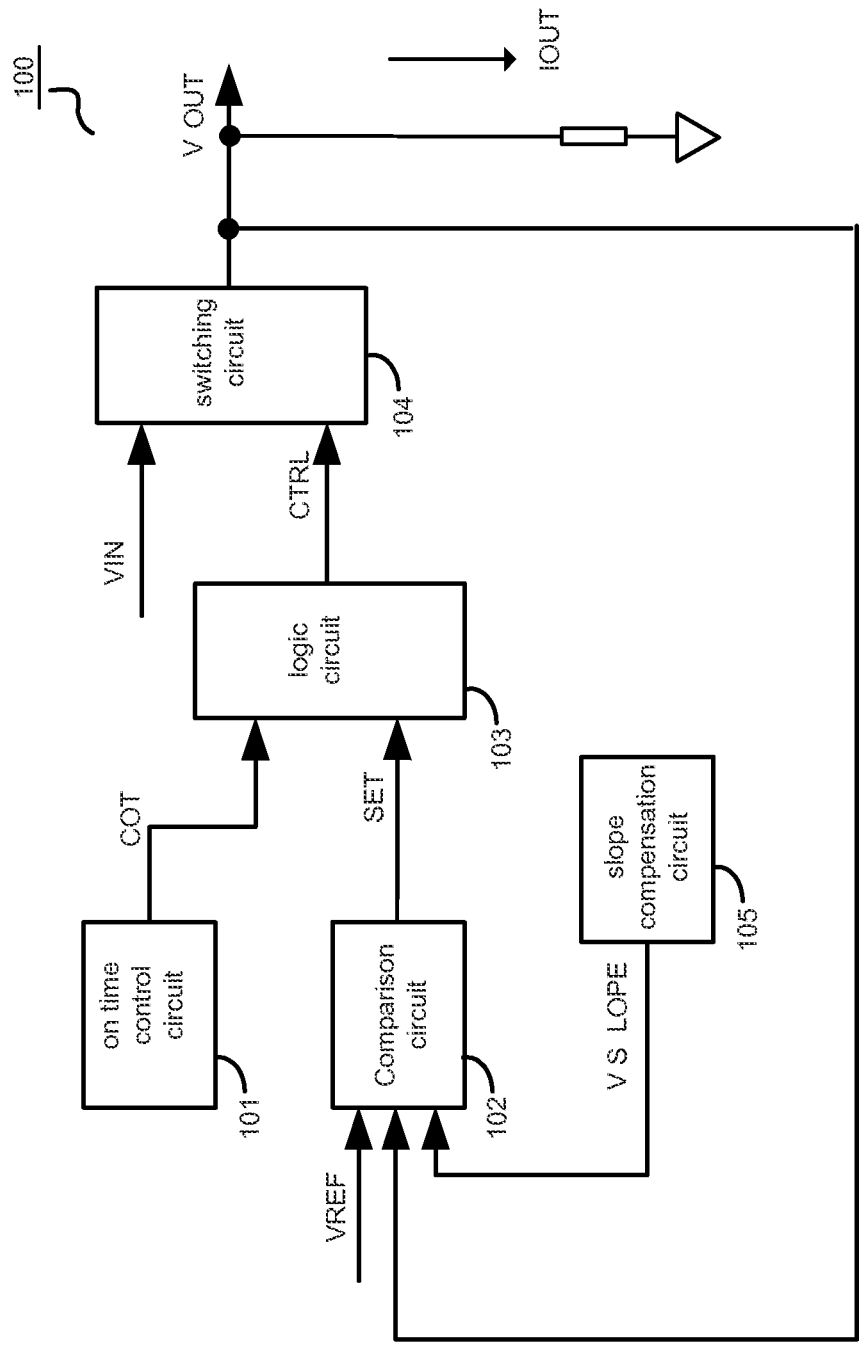
FIG. 1 schematically illustrates a prior art conventional constant on time converter 100.
Figure 2:
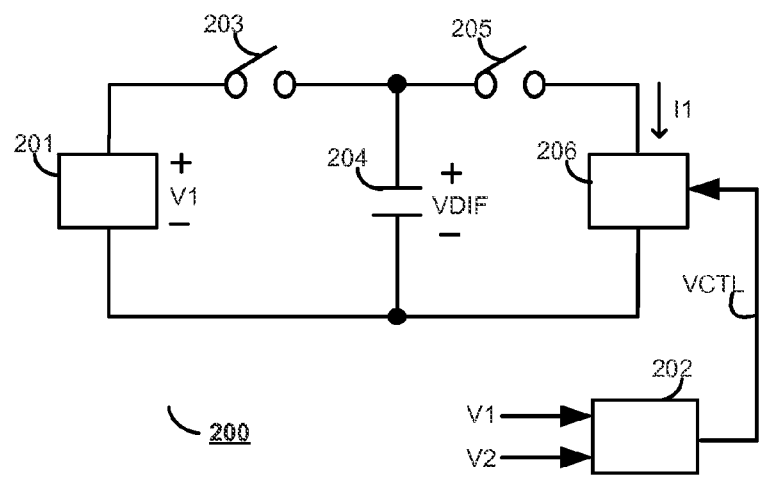
FIG. 2 schematically illustrates a slope compensation circuit 200 in accordance with an embodiment of the present invention.

FIG. 2 schematically illustrates a slope compensation circuit 200 in accordance with an embodiment of the present invention. The slope compensation circuit 200 can be used within a variety of switching converters, such as the switching converter 100 shown in FIG. 1 and many other types of switching converters which may be utilized peak current control mode, average current control mode, or other suitable control modes.

Referring to FIG. 2, the slope compensation circuit 200 comprises a first voltage source 201, a first operation circuit 202, a first switch 203, a first capacitor 204, a second switch 205 and a first controlled current source (CCS) 206. The first voltage source 201 has a first terminal and a second terminal, configured to provide a first voltage signal V1. The first operation circuit 202 has a first input terminal configured to receive the first voltage signal V1, a second input terminal configured to receive a second voltage signal V2, and an output terminal configured to provide a current control signal VCTL according to the first voltage signal V1 and the second voltage signal V2. The first switch 203 has a first terminal and a second terminal, wherein the first terminal of the first switch 203 is coupled to the first terminal of the first voltage source V1. The first capacitor 204 has a first terminal coupled to the second terminal of the first switch 203 and a second terminal coupled to the second terminal of the first voltage source V1. The second switch 205 has a first terminal and a second terminal, wherein the first terminal of the second switch 205 is coupled to the first terminal of the first capacitor 204. The first CCS 206 has a first terminal, a second terminal and a control terminal, wherein the first terminal of the first CCS 206 is coupled to the second terminal of the second switch 205, wherein the second terminal of the first CCS 206 is coupled to the second terminal of the first capacitor 204, wherein the control terminal of the first CCS 206 is coupled to the output terminal of the first operation circuit 202. The first CCS 206 is configured to provide or sink a first controlled current signal I1 according to the current control signal VCTL. The voltage signal across the capacitor 204 is defined as a first difference signal VDIF hereafter. In an embodiment, the first difference signal VDIF serves as a slope compensation signal in a switching converter. The slope of the first difference signal VDIF could be adjusted by the first controlled current signal I1.

In an embodiment, the first operation circuit 202 provide the current control signal VCTL according to the product of the first voltage signal V1 and the second voltage signal V2 (i.e. V1×V2), and the first controlled current signal I1 provided by the first CCS 206 is proportional or linear proportional to the current control signal VCTL. In another embodiment, the first operation circuit 202 provides the current control signal VCTL according to the ratio of the first voltage signal V1 to the second voltage signal V2 (i.e. V1/V2), and the first current signal I1 provided by the first CCS 206 is proportional or linear proportional to the current control signal VCTL. For the above two embodiments, since the first controlled current signal I1 is proportional or linear proportional to the current control signal VCTL, the discharging time of the first capacitor 204 is maintained substantially constant despite a change to the first voltage signal V1.

Figure 3:
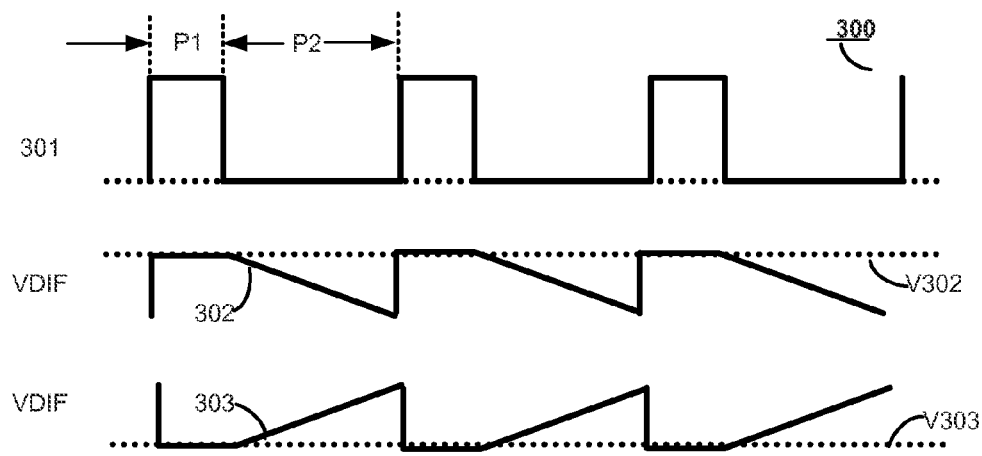
FIG. 3 shows operational waveforms of the slope compensation circuit 200 in accordance with an embodiment of the present invention.

FIG. 3 shows operational waveforms of the slope compensation circuit 200 in accordance with an embodiment of the present invention. The first switch 203 and the second switch 205 are controlled by a switching signal 301. In one embodiment, the first terminal of the first voltage circuit 201 is defined as an anode (positive electrode), and the second terminal of the first voltage circuit 201 is defined as a cathode (negative electrode). The first current I1 flows from the first terminal of the first CCS 206 to the second terminal of the first CCS 206. Referring to operational waveform 302 shown in FIG. 3, in a first period P1, the first switch 203 is turned on, and the second switch 205 is turned off. The first voltage source 201 charges the first capacitor 204 quickly, and the first difference signal VDIF increases to a constant voltage V302 in a short time, wherein the constant value V302 is decided by the first voltage circuit 201. In a second period P2, the first switch 203 is turned off, and the second switch 205 is turned on. The first CCS 206 discharges the capacitor 204, and the first difference signal VDIF is decreased slowly. In another embodiment, the first terminal of the first voltage circuit 201 is defined as a cathode, and the second terminal of the first voltage circuit 201 is an anode. The first current I1 flows from the second terminal of the first CCS 206 to the first terminal of the first CCS 206. Referring to operational waveform 303 shown in FIG. 3, in a first period P1, the first switch 203 is turned on, and the second switch 205 is turned off. The first voltage source 201 discharges the first capacitor 204 quickly, and the first difference signal VDIF decreases to a constant voltage V303 in a short time, wherein the constant value V303 is decided by the first voltage circuit 201. In a second period P2, the first switch 203 is turned off, and the second switch 205 is turned on. The first CCS 206 charges the capacitor 204, and the he first difference signal VDIF is increased. The waveform of the first difference signal VDIF could be variable by setting one or more following factors: the anode and cathode of the first voltage circuit 201; the first controlled current I1; the ON time or the OFF time of the first switch 203; and the ON time or the OFF time of the second switch 205.

Figure 4:
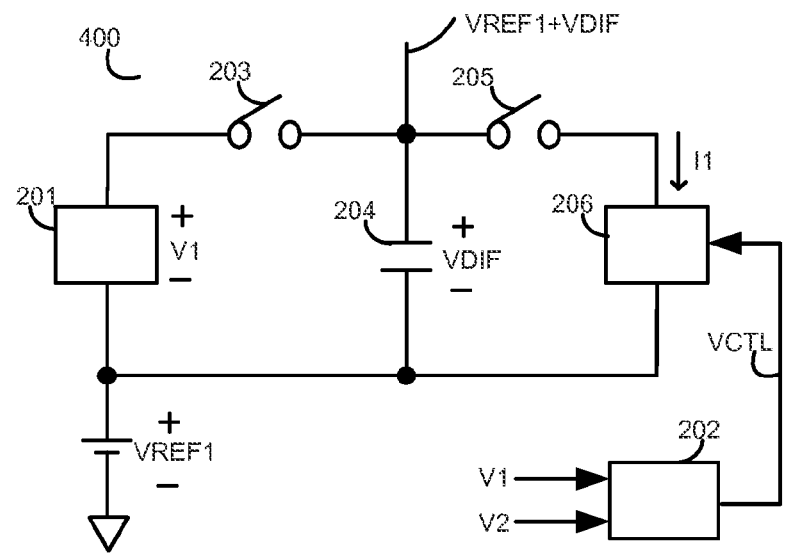
FIG. 4 schematically illustrates a slope compensation circuit 400 in accordance with an embodiment of the present invention.
Figure 5:
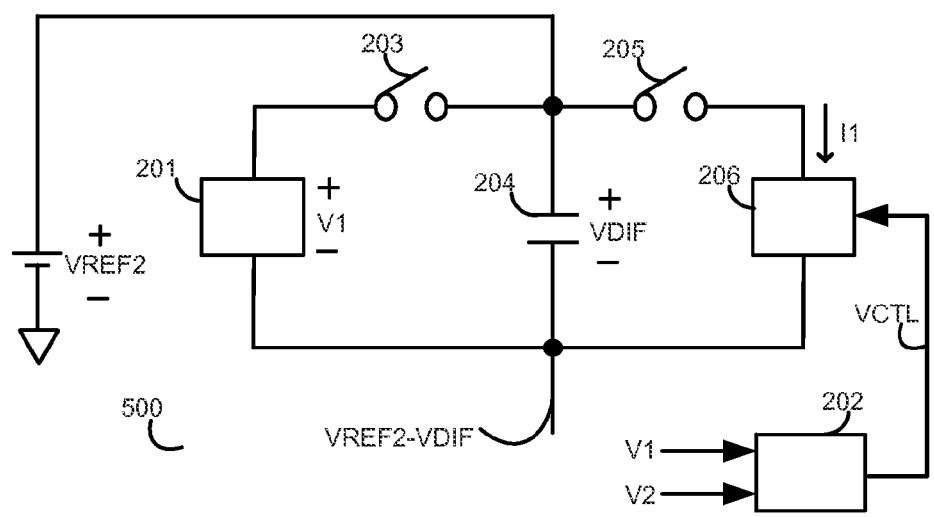
FIG. 5 schematically illustrates a slope compensation circuit 500 in accordance with an embodiment of the present invention.

In one embodiment, the first difference signal VDIF could directly serve as a slope compensation signal in a switching converter. In other embodiments, an amplified or processed first difference signal VDIF would serve as a slope compensation signal in a switching converter. In yet another embodiment, the voltage signal on the first terminal of the first capacitor 204 may alternatively serve as a slope compensation signal in a switching converter. The second terminal of the first voltage 201 or the second terminal of the first capacitor 204 may be coupled to the ground potential or any other potential. For example, in illustrated embodiment shown in FIG. 4, for slope compensation circuit 400, the second terminal of the first voltage 201 and the second terminal of the first capacitor 204 are coupled to a first reference voltage VREF1. So, a sum of the first difference signal VDIF and the first reference voltage VREF1 (VREF1+VDIF) is obtained on the first terminal of the first capacitor 204. The first terminal of the first voltage source 201 or the first terminal of the first capacitor 204 may be coupled to the ground potential or any other potential. For another example, in the illustrated embodiment shown in FIG. 5, for slope compensation circuit 500, the first terminal of the first capacitor 204 is coupled to a second reference voltage VREF2. So, a difference between the first reference voltage VREF2 and the first difference signal VDIF (VREF2−VDIF) is obtained on the second terminal of the first capacitor 204.

Figure 6:
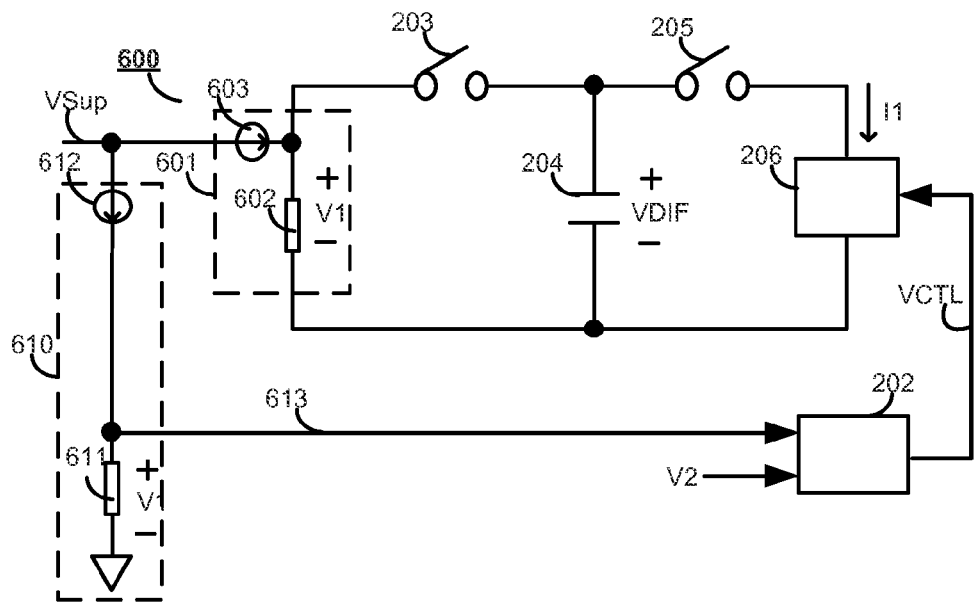
FIG. 6 schematically illustrates a slope compensation circuit 600 in accordance with an embodiment of the present invention.

The first voltage circuit 201 may utilize a voltage follower, an amplifier, a buffer, a diode, a zener or a resistor. FIG. 6 schematically illustrates a slope compensation circuit 600 in accordance with an embodiment of the present invention. The slope compensation circuit 600 comprises a first voltage source 601 and a detecting circuit 610. The first voltage circuit 601 comprises a first current source 603 having a first terminal and a second terminal, and a first resistor 602 having a first terminal and a second terminal. The first terminal and the second terminal of the first resistor 602 are respectively configured as a first terminal and a second terminal of the first voltage circuit 601. The first current source 603 has a first terminal and a second terminal, wherein one terminal is coupled to the first terminal of the first resistor 602, while the other terminal is coupled to a reference power VSup. Due to the resistance of the first resistor 602 and the load capability of the first current source 603, the load capability of first voltage 601 may be limited. For example, the first voltage circuit 601 may charge or discharge the first capacitor 204 slowly. In that case, in the beginning of period P1, waveforms 302 and 303 shown in FIG. 3 would change slowly. In some embodiments, the first switch 203 is coupled to the first terminal of the first voltage circuit 601 via a current limiting resistor to prevent the first switch 203 or the first voltage 601 from being damaged by excessive current.

Figure 7:
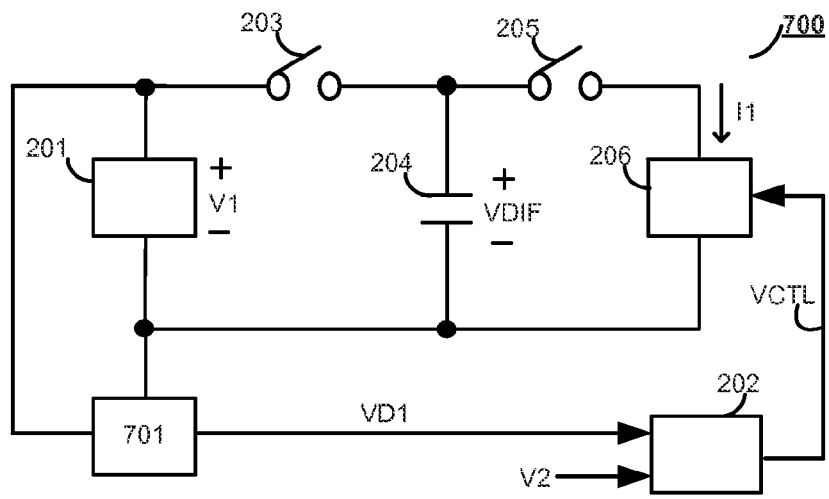
FIG. 7 schematically illustrates a slope compensation circuit 700 in accordance with an embodiment of the present invention.

FIG. 7 schematically illustrates a slope compensation circuit 700 in accordance with an embodiment of the present invention. Compared with the slope compensation circuit 200 shown in FIG. 2, the slope compensation circuit 700 further comprises a first detecting circuit 701. The first input of the first operation circuit 202 is coupled to the first terminal of the first voltage source 201 via the first detecting circuit 701. The first detecting circuit 701 has a first terminal coupled to the first terminal of the first voltage 201, a second terminal coupled to the second terminal of the voltage 201, and an output terminal configured to provide a first detecting signal VD1 according to the first voltage V1. In one embodiment, the first detecting signal VD1 is proportional to the first voltage V1. In another embodiment, the first detecting signal VD1 is linear proportional to the first voltage V1.

Referring to the slope compensation circuit 600 shown in FIG. 6, the first detecting circuit 610 comprises a second resistor 611 and a second current source 612. A first terminal of the second resistor 611 is coupled to the first input of the first operation circuit 202 to provide a first detecting signal 613. The second terminal of the second resistor 611 is coupled to the ground potential. The second current source 612 has a first terminal coupled to the reference power supply VSup, and a second terminal coupled to the first terminal of the second resistor 611. The current of the second current source 612 is linearly proportional to the current of the second current source 603. So, first detecting signal 613 is linearly proportional to the first voltage signal V1. In another embodiment, a second resistor 611 and second current source 612 could be defined as part of the first voltage circuit 601. In that case, the first voltage circuit 601 would provide a voltage signal that is proportional to the first voltage V1. For this reason, the wording "the current control signal VCTRL is according to the first voltage V1 and the second voltage V2" does not mean that the first operation circuit 202 should directly receive, use the first voltage signal V1. A first operation circuit 202 could use or receive a signal related to the first voltage V1 (e.g., equal or proportional to the first voltage signal V1) to achieve the object of the present invention.

Figure 8:
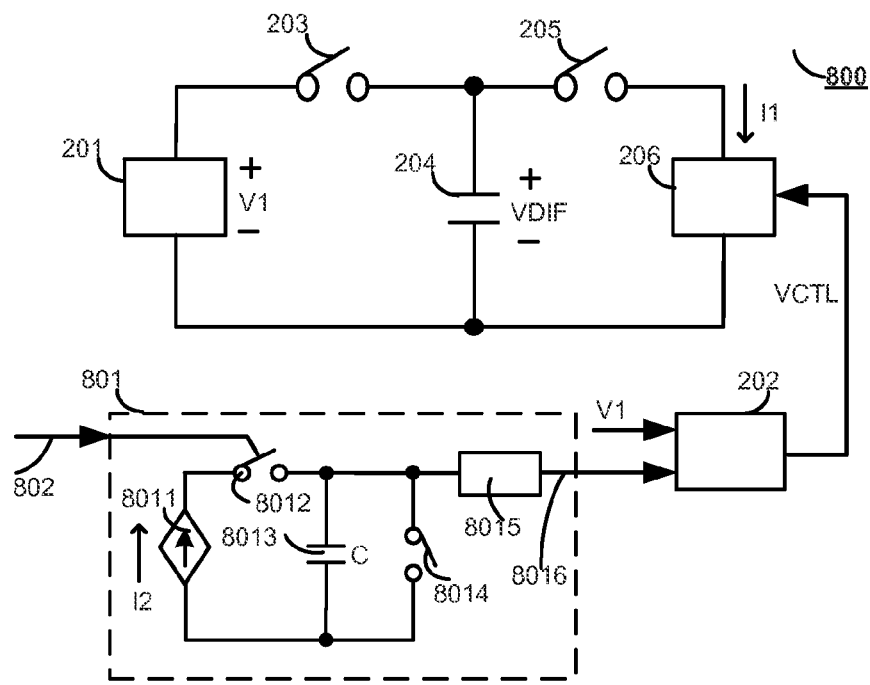
FIG. 8 schematically illustrates a slope compensation circuit 800 in accordance with an embodiment of the present invention.

FIG. 8 schematically illustrates a slope compensation circuit 800 in accordance with an embodiment of the present invention. Compared with the slope compensation circuit 200 shown in FIG. 2, the slope compensation circuit 800 shown in FIG. 8 further comprises a second detecting circuit 801. The second detecting circuit 801 has an input terminal and an output terminal. The input terminal is configured to receive a first status signal 802, and the output terminal is configured to provide a sampling-hold signal 8016. In an embodiment, the output terminal of the second detecting circuit 801 is coupled to the second input of the operation circuit 202, the sampling-hold signal 8016 serves as the second voltage signal V2 shown in FIG. 2.

The second detecting circuit 801 comprises a second current source 8011, a third switch 8012, a second capacitor 8013, a fourth switch 8014 and a sampling-hold circuit 8015. The second current source 8011 has a first terminal and a second terminal, configured to provide a second controlled current I2. The third switch 8012 has a first terminal and a second terminal, wherein the first terminal of the third switch 8012 is coupled to the first terminal of the second current source 8011. The second capacitor 8013 has a first terminal and a second terminal, wherein the first terminal of the second capacitor 8013 is coupled to the second terminal of the third switch 8012, and wherein the second terminal of the second capacitor 8013 is coupled to the second terminal of the second current source I2. The fourth switch 8014 has a first terminal and a second terminal, wherein the first terminal of the fourth switch 8014 is coupled to the first terminal of the second capacitor 8013. The sampling-hold circuit 8015 has an input terminal and an output terminal, wherein the input terminal of the sampling-hold circuit 8015 is coupled to the first terminal of the second capacitor 8013, wherein the output terminal of the sampling-hold circuit 8015 is configured to provide a sampling-hold signal 8016. In one embodiment, the sampling-hold signal 8016 serve as the second voltage signal V2 shown in FIG. 2.

Figure 9:
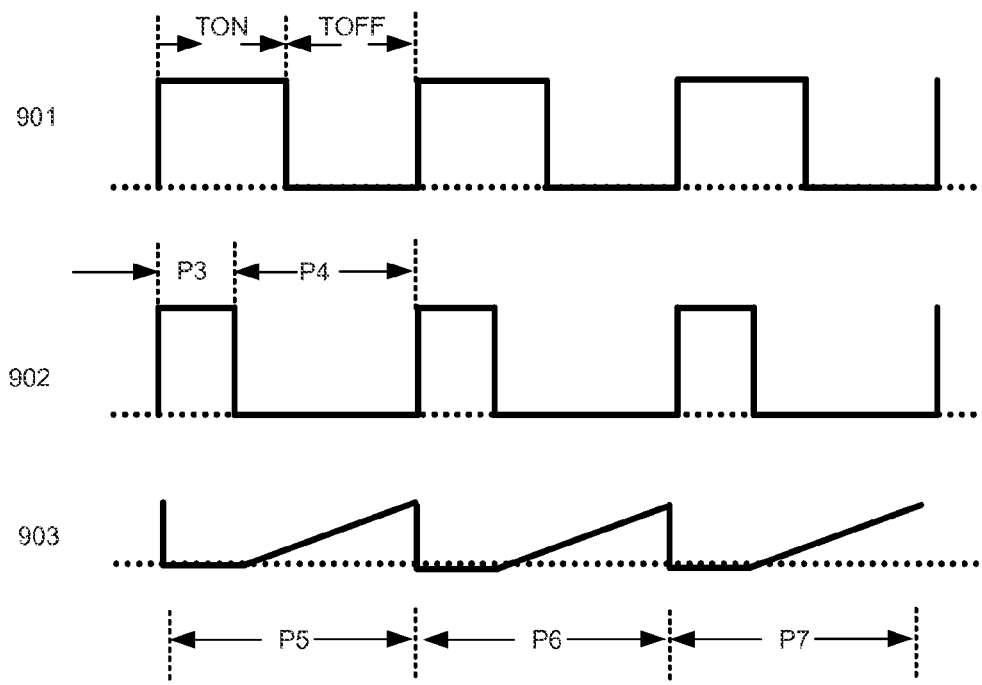
FIG. 9 shows operational waveforms of the second detecting circuit 801 in accordance with an embodiment of the present invention.

FIG. 9 shows operational waveforms of the second detecting circuit 801 in accordance with an embodiment of the present invention. In one embodiment, the control signal CTRL in the switching converter 100 would be directly served as the first status signal 802. In another embodiment, a first status signal 902 could be obtained from a sum between the OFF time (low level) of the control signal CTRL and a constant OFF time. Referring to FIG. 8 and FIG. 9, the first status signal 902 controls the third switch 8012 and the fourth switch 8014, and the signal 903 indicates the voltage across the second capacitor 8013. In a third period P3, the fourth switch 8014 is turned on, and the third switch 8012 is turned off. The voltage across the first capacitor 204 is zero. In a fourth period P4, the fourth switch 8014 is turned off, and the third switch 8012 is turned on. The second current source 8011 charges the second capacitor 8013, so that the voltage across the second capacitor 8013 (the signal 903) increases. In another embodiment, the third switch 8012 is controlled by the signal 902 while the fourth switch 8014 is controlled by a reset signal, wherein the reset signal turns on the fourth switch 8014 at the end of period P4.

In one embodiment, the sampling-hold circuit 8015 is configured to provide the sampling-hold signal 8016 according to peak voltage across the capacitor 8013 in the prior period. For example, the sampling-hold circuit 8015 samples the peak voltage in period P5 and holds the peak voltage during the following period P6.

Figure 10:
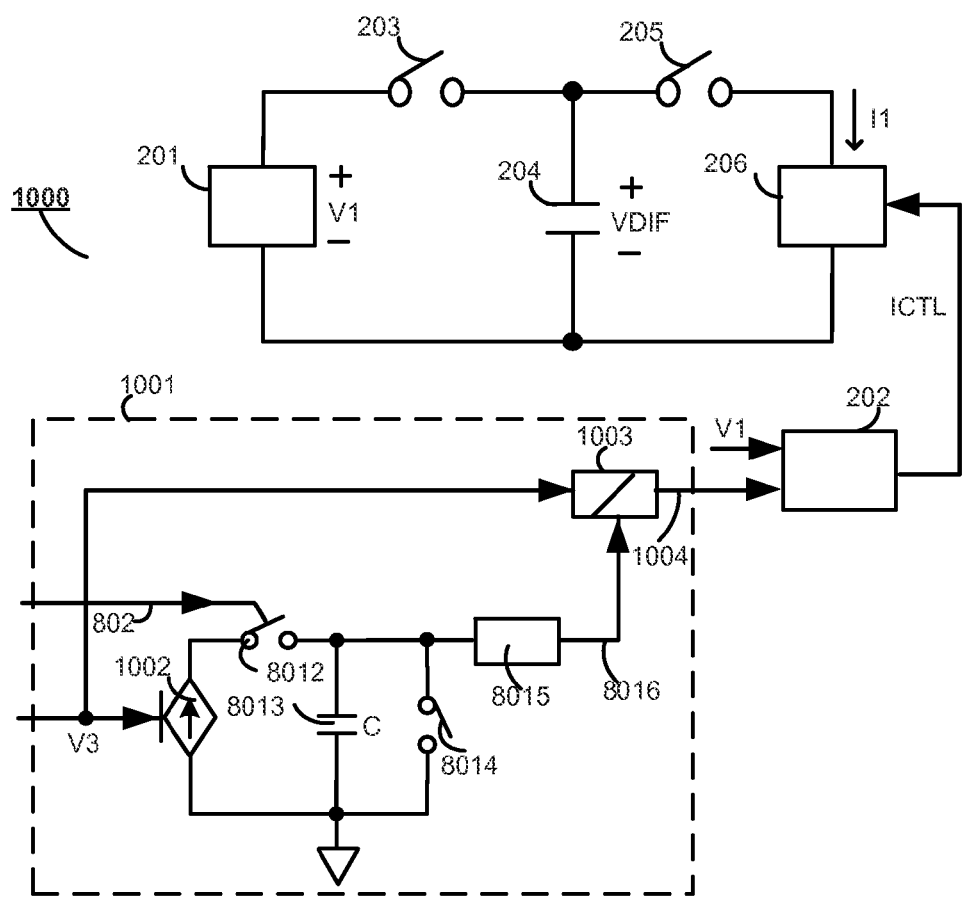
FIG. 10 schematically illustrates a slope compensation circuit 1000 in accordance with an embodiment of the present invention.

FIG. 10 schematically illustrates a slope compensation circuit 1000 in accordance with an embodiment of the present invention. Compared with the slope compensation circuit 800 shown in FIG. 8, the slope compensation circuit 1000 applies a second detecting circuit 1001 to replace the second detecting circuit 801. The second detecting circuit 1001 comprises a second controlled current source (CCS) 1002, the third switch 8012, the second capacitor 8013, the fourth switch 8014, the sampling-hold circuit 8015 and a division circuit 1003. The second CCS 1002 has a first terminal coupled to the first terminal of the third switch 8012, a second terminal coupled to second terminal of the second capacitor 8013, and a control terminal for receiving a third voltage signal V3. The second CCS 1002 provides a second controlled current I2 according to the third voltage signal V3. the division circuit 1003 has a first input to receive the third voltage signal V3, a second input terminal coupled to output terminal of the sampling-hold circuit 8015 to receive the sampling-hold signal 8016, and an output terminal to provide a division signal 1003, wherein division signal 1003 is a ratio of the third voltage signal V3 to the sampling-hold signal 8016 (i.e. V3/V8016).

In one embodiment, the second controlled current I2 is proportional to the third voltage signal V3, and the second controlled current I2 could be expressed as $$I2 = IB + K2 \times V3 \tag{1}$$

Wherein IB is a second initial current and K2 is a second conductivity factor. The second controlled current I2 is linear proportional to the third signal voltage V3 when the second initial current IB is zero and K2 is a constant.

Similarly, the first controlled current I1 provided by the first CCS 206 could be expressed as $$I1 = IA + K1 \times VCTL \qquad (2)$$

Wherein IA is a first initial current value and K1 is a first conductivity factor. The first controlled current I1 is linear proportional to the current control signal VCTL when IA is set to zero and K1 is a constant.

In one embodiment, the second initial current IB is zero. So, the peak voltage VPEAK across the capacitor 8013 could be expressed as, $$VPEAK = \frac{I2 \times TP4}{C8013} = \frac{K2 \times V3 \times TP4}{C8013} \qquad (3)$$

Wherein TP4 is the ON time of the third switch 8012, and it equals to the OFF time (low level) of signal 902 shown in FIG. 9, C8013 is capacitance value of the second capacitor 8013.

The division signal 1004 is a ratio of the third voltage signal V3 to the peak voltage VPEAK. The division signal 1004 could be expressed as $$V1004 = \frac{V3}{VPEAK} = \frac{C8013}{K2 \times TP4} \qquad (4)$$

The second detecting circuit 1001 may provide a normalized output voltage by employing the division circuit 1003. In one embodiment, the division signal 1004 serves as the second voltage signal V2 shown in FIG. 2, and the current control signal VCTL equals to the product of the first voltage signal V1 and the division signal 1004, and the first initial current IA is zero. According to equation (2), the first controlled current I1 could be expressed as $$I1 = K1 \times V1 \times V2 = K1 \times V1 \times V1003 = \frac{K1 \times V1 \times C8013}{K2 \times TP4} \qquad (5)$$

According to equation (5), the first controlled current I1 is decided by the circuit parameters (K1, K2, and C8013), the first voltage signal V1 and the OFF time TP4 of signal 902. The slope of the first difference signal VDIF could be expressed as, $$\frac{dv}{dt} = \frac{I1}{C204} = \frac{K1 \times V1 \times C8013}{C204 \times K2 \times TP4} \qquad (6)$$

According to (6), the slope is decided by the by the circuit parameters (K1, K2, and C8013), the first voltage signal V1 and the off time TP4 of signal 902. Referring to FIG. 9, since TP4 is related to the OFF time of the control signal CTRL in the switching converter 100, the slope compensation circuit 1000 could adjust the slope of the first difference signal VDIF according to the OFF time of the control signal CTRL.

Those skilled in the art could understand that in other embodiments, the division circuit 1003 can also provide a division signal according to a ratio of sampling-hold signal 8016 to the third voltage signal V3 (i.e., V8016/V3). In this case, to obtain a first controlled current I1 shown in the equation (5), the first operation circuit 202 provides the current control signal VCTL according to the ratio of the first voltage signal V1 to the division signal 1004 (i.e., V81/V1004). Meanwhile, the person skilled in the art may further understand that, in order to obtain a better effect, the above described embodiments use the multiplication and division operation rule. However, in some other embodiments, addition and subtraction could be applied to replace multiplication and division. One with ordinary skill in the art could properly set the operation rule between the first voltage signal V1 and the second voltage signal V2 according to application environments. The operation rules of the first operation circuit 202 comprise but not limited to addition, subtraction, multiplication, division, integral and differential.

Figure 11:
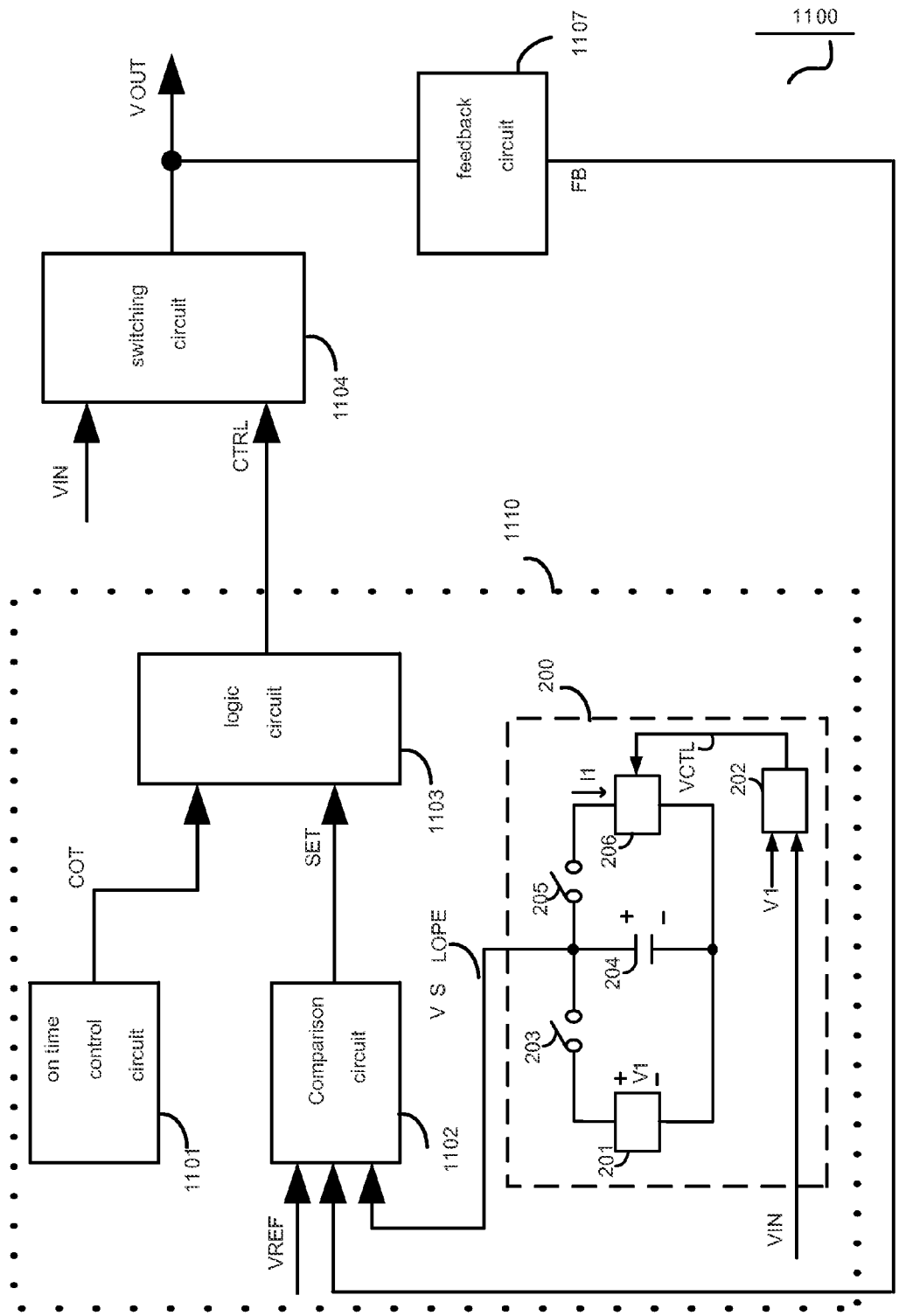
FIG. 11 schematically illustrates a switching converter 1100 in accordance with an embodiment of the present invention.

FIG. 11 illustrates a block diagram of a constant ON-time converter 1100 in accordance with an embodiment of the present invention. Constant ON-time converter 1100 comprises a control circuit 1110, a switching circuit 1104 and a feedback circuit 1107. Switching circuit 1104 comprises a power switch (not shown), and constant ON-time converter 1100 comprises an input terminal configured to receive an input voltage VIN and an output terminal configured to provide an output voltage VOUT. Constant ON-time converter 1100 is configured to provide output voltage VOUT from input voltage VIN via turning ON and OFF the power switch. Switching circuit 1104 may adopt any direct current to direct current (DC/DC) circuit and alternating current to direct current (AC/DC) topology, such as step-up converter, step-down converter, forward converter, and fly back converter and so on. Feedback circuit 1107 is configured to provide a feedback signal VFB indicating output voltage OUT. Feedback circuit 1107 may comprise a resistor divider or a sampling resistor.

Control circuit 1110 comprises an ON-time control circuit 1101, a comparing circuit 1102, a logic circuit 1103 and the slope compensation circuit 200 shown in FIG. 2. ON-time control circuit 1101 is configured to provide an ON-time period control signal COT to control an ON-time period of the power switch. Slope compensation circuit 200 is configured to provide a slope compensation signal VSLOPE. Comparing circuit 1102 is configured to provide a comparing signal SET via comparing a sum of slope compensation signal VSLOPE and the feedback signal FB with a reference signal VREF. Logic circuit 1103 comprises a first input configured to receive ON-time period control signal COT, a second input configured to receive the comparing signal SET, and an output coupled to a control terminal of the switch to provide a control signal CTRL.

In one embodiment, the second input of the first operation circuit 202 in the slope compensation 200 is coupled to the input terminal of the switching converter 1100 for receiving the input voltage VIN. So, the input voltage VIN serves as the second voltage V2 shown in FIG. 2. The first operation circuit 202 is configured to provide the current control signal VCTL according to the ratio of the first voltage signal V1 and a second voltage signal V2, wherein the second voltage V2 is proportional to the input voltage VIN. Thus, when the input voltage VIN decreases, the current control signal VCTL and the first controlled current I1 increase, so as to increase the slope of the voltage signal across the first capacitor 204 which serves as the slope compensation signal VSLOPE. In some embodiments, increasing the slope of the slope compensation signal VSLOPE may alleviate the degeneration of the line regulation caused by the input voltage VIN decrease. Such effect will be detailed discussed later.

The slope compensation circuits shown in FIG. 3-10 could be used to replace the slope compensation circuit 200 in the switching converter 1100.

Figure 12:
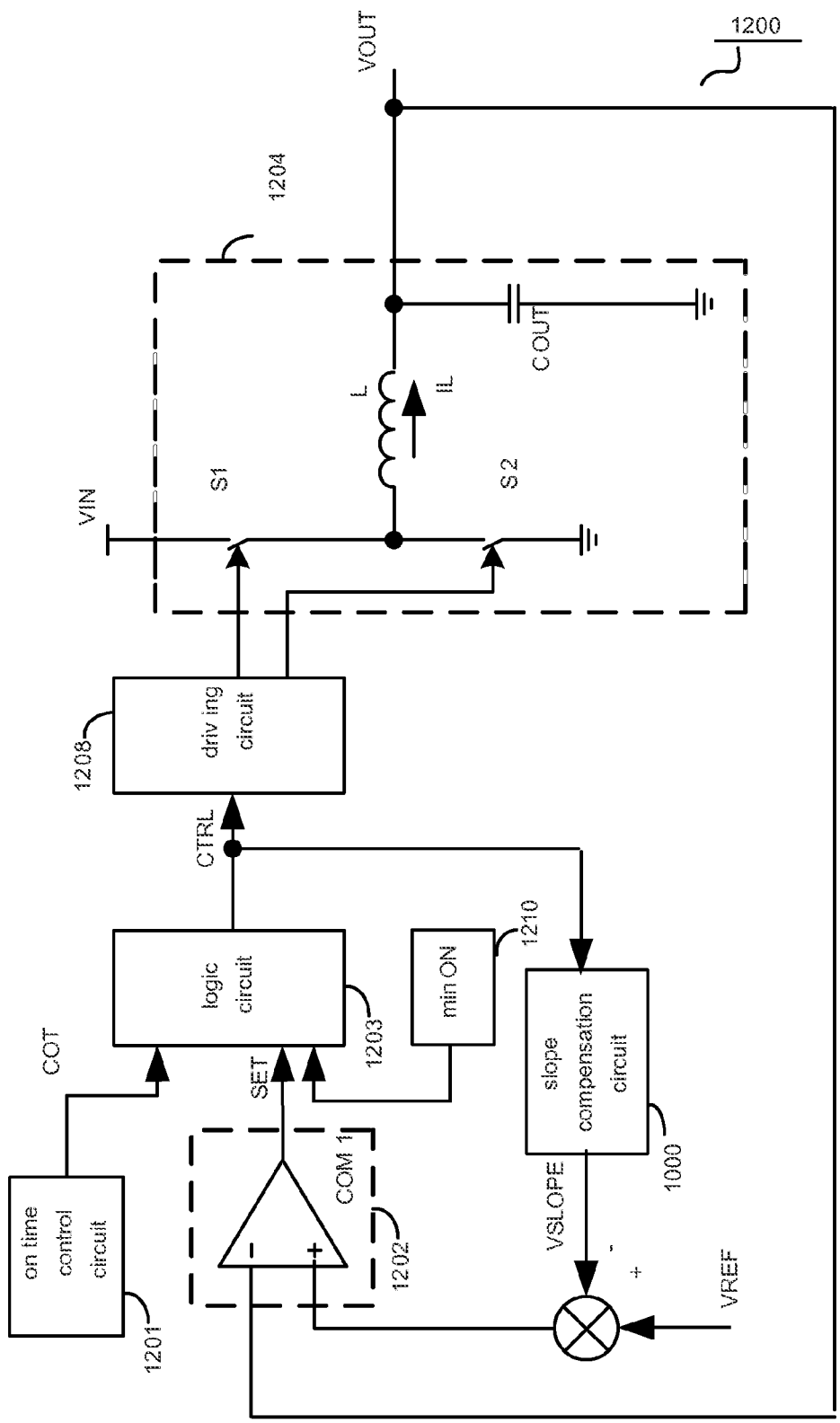
FIG. 12 schematically illustrates a switching converter 1200 in accordance with an embodiment of the present invention.

FIG. 12 schematically illustrates a constant ON-time converter 1200 in accordance with an embodiment of the present invention. Constant ON-time converter 1200 comprises an ON-time control circuit 1201, a comparing circuit 1202, a logic circuit 1203, a switching circuit 1204, the slope compensation circuit 1000, and a driving circuit 307. Switching circuit 1204 adopts synchronous step-down topology as an example. Switching circuit 1204 comprises a power switch S1, a power switch S2, an inductor L and an output capacitor COUT. Constant ON-time converter 1200 is configured to provide an output voltage VOUT from an input voltage VIN via turning ON and OFF switch S1 and switch S2. Switch S1 comprises a first terminal coupled to input voltage VIN, a second terminal and a control terminal. Switch S2 comprises a first terminal coupled to the second terminal of switch S1, a second terminal coupled to a system ground and a control terminal. A first terminal of inductor L is coupled to the second terminal of switch S1 and the first terminal of switch S2, a second terminal of inductor L is coupled to a first terminal of output capacitor COUT, and a second terminal of output capacitor COUT is coupled to the system ground. Voltage across output capacitor COUT is output voltage VOUT.

Slope compensation circuit 1000 shown in FIG. 10 is employed to provide a slope compensation signal VSLOPE. In an embodiment, the control signal CTRL is served as the first status signal 802 shown in FIG. 10 and used to control the third switch 8012 and the fourth switch 8014 shown in FIG. 10. It should be known that the slope compensation circuits shown in FIG. 2-9 could be used to replace the slope compensation circuit 1000 in the switching converter 1100.

Comparing circuit 1202 comprises a first input coupled to the output of slope compensation circuit 1000 and a voltage reference VREF, a second input configured to receive the output voltage VOUT, and an output configured to provide a comparing signal SET. In one embodiment, comparing circuit 302 comprises a comparator COM1. Comparator COM1 comprises an inverting input configured to receive the sum of slope compensation circuit VSLOPE and voltage reference VREF, a non-inverting input configured to receive the output voltage VOUT and an output configured to provide comparing signal SET. In some embodiments, the non-inverting input of the comparator CM1 is coupled to the output voltage VOUT via a feedback circuit 1107 shown in FIG. 11.

ON-time control circuit 1201 comprises an output configured to provide ON-time period control signal COT to control an ON-time period of switch S1 or an ON-time period of switch S2. Logic circuit 1203 comprises a first input coupled to the output of ON-time control circuit 1201, a second input coupled to the output of comparing circuit 1202, and an output configured to provide control signal CTRL. Constant ON-time converter 1200 may further comprise a driving circuit 1208 having an input coupled to the output of logic circuit 1203 to receive control signal CTRL, a first output coupled to the control terminal of switch S1 and a second output coupled to the control terminal of switch S2.

In one embodiment, the switching converter 1200 further comprises a minimum off-time control circuit 1210 to prevent the comparing circuit 1202 from being affected by the system noise. The comparing signal SET is disabled by the minimum off-time control circuit 1210 during a minimum off-time TOFFMIN. The minimum off-time control circuit 1210 is well-known to the person skilled in the art and will not be described in detail.

Figure 13:
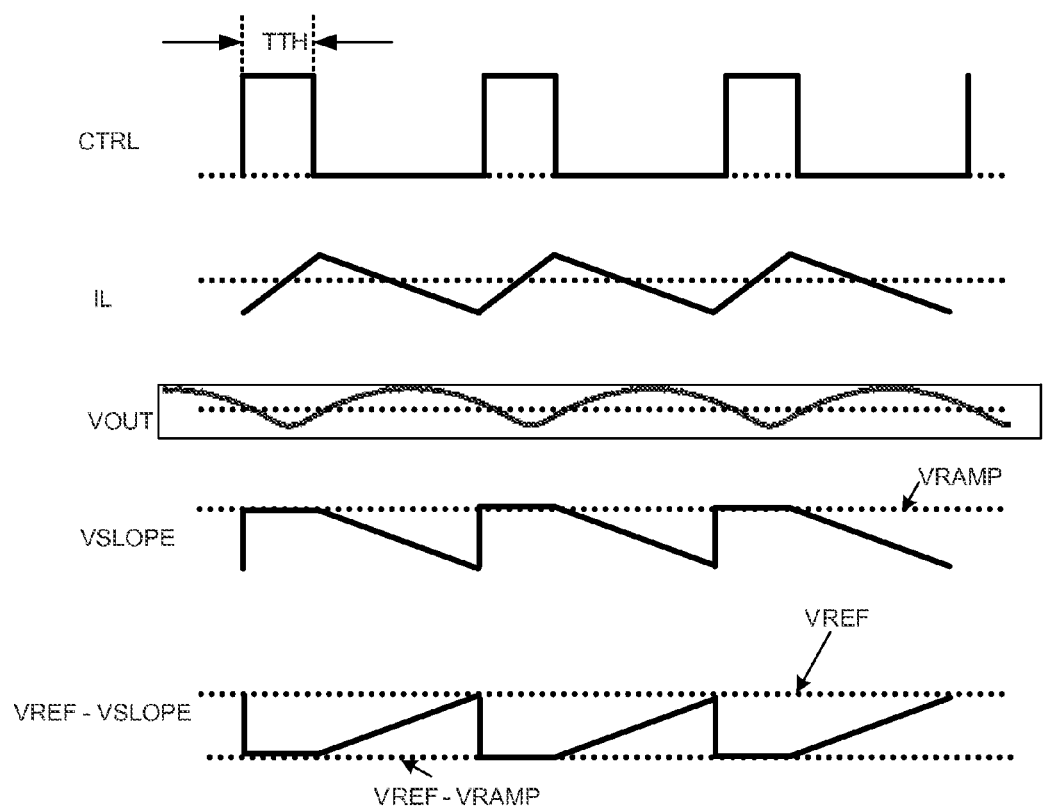
FIG. 13 shows operational waveforms of the switching converter 1200 in accordance with an embodiment of the present invention.
Figure 14:
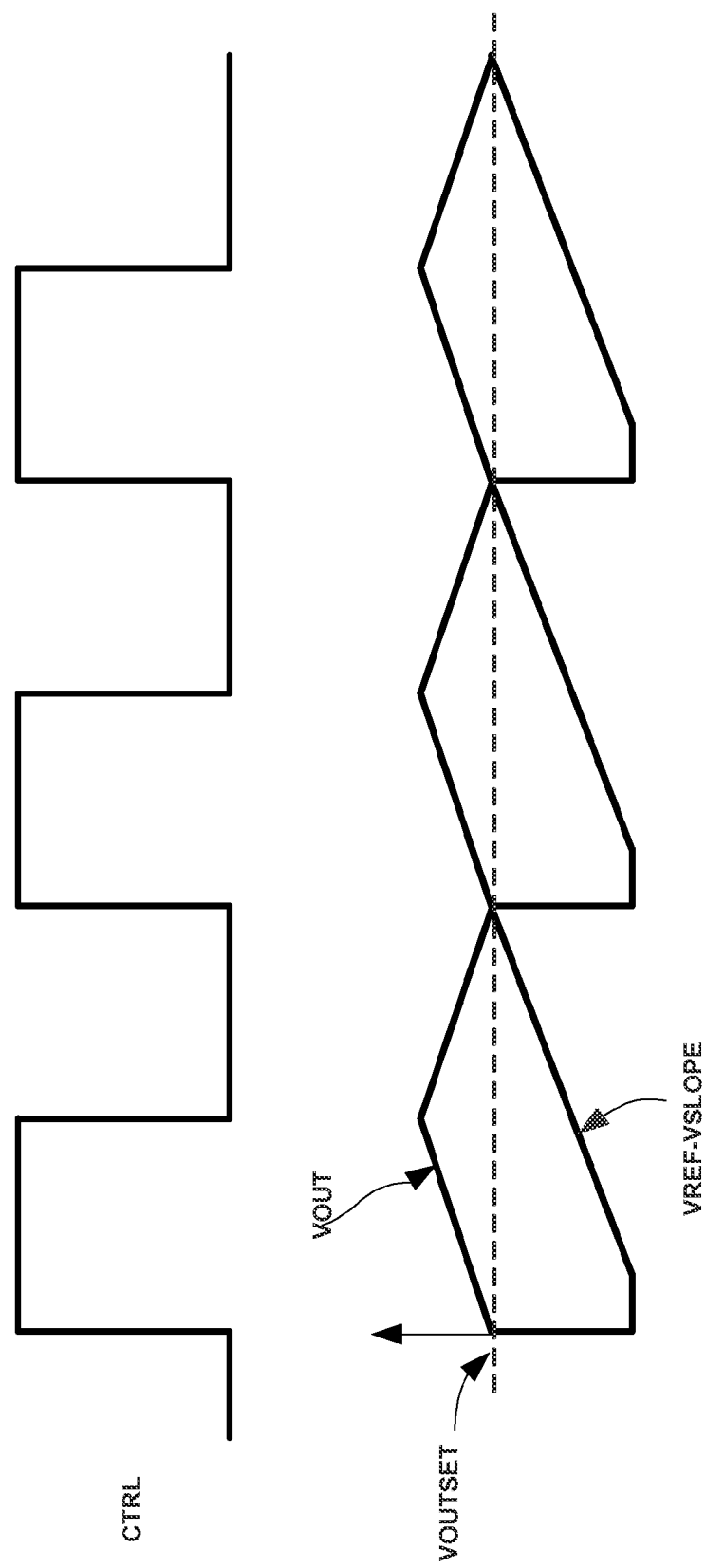
FIG. 14 shows enlarged operational waveforms of the switching converter 1200 in accordance with an embodiment of the present invention.

FIG. 13 is a waveform of the switching converter 1200 shown in FIG. 12 in steady status in accordance with one embodiment of the present invention. When the control signal CTRL is logical high, the switch S1 is turned on and the switch S2 is turned off. The inductor current IL is increased. When the on-time of the switch S1 reaches a time threshold TTH set by the on-time control circuit 1201, the control signal CTRL is changed into logical low. The switch S1 is turned off and the switch S2 is turned on. The inductor current IL is decreased. When the output voltage VOUT becomes smaller than the difference between the reference signal VREF and the slope compensation signal VSLOPE, the control signal CTRL is changed into logical high. The switch S1 is turned on and the switch S2 is turned off. These processes are repeated. As shown in FIG. 14, if the input voltage VIN or the load current IOUT is constant, the control signal CTRL is changed into logical high when the output voltage VOUT becomes smaller than pre-set voltage threshold VOUTSET. For better showing, the output voltage VOUT is shown as a saw-tooth signal in FIG. 14.

In the embodiment shown in FIG. 14, the slope compensation signal VSLOPE is set to its maximum value VRAMP when the switch S1 is on and the switch S2 is off. The slope compensation signal VSLOPE is decreased in a given rate when the switch S1 is off and the switch S2 is on. However, the slope compensation signal VSLOPE may be configured in other forms. The time period when the slope compensation signal VSLOPE maintains its maximum value VRAMP may be longer than the time threshold TTH, such as TTH+TOFFMIN. Besides, the slope compensation signal VSLOPE may be a triangular signal which is in phase with the inductor current IL. The slope compensation signal VSLOPE is increased when the switch S1 is on and the switch S2 is off, and decreased when the switch S1 is off and the switch S2 is on.

In the embodiments below shown in FIG. 15 and FIG. 16, the slope compensation signal VSLOPE is a saw-tooth signal. It is set to its maximum value VRAMP once the switch S1 is turned on, and is decreased after then. The person skilled in the art can recognize, however, that the slope compensation signals VSLOPE configured in other forms are also applicable.

Figure 15:
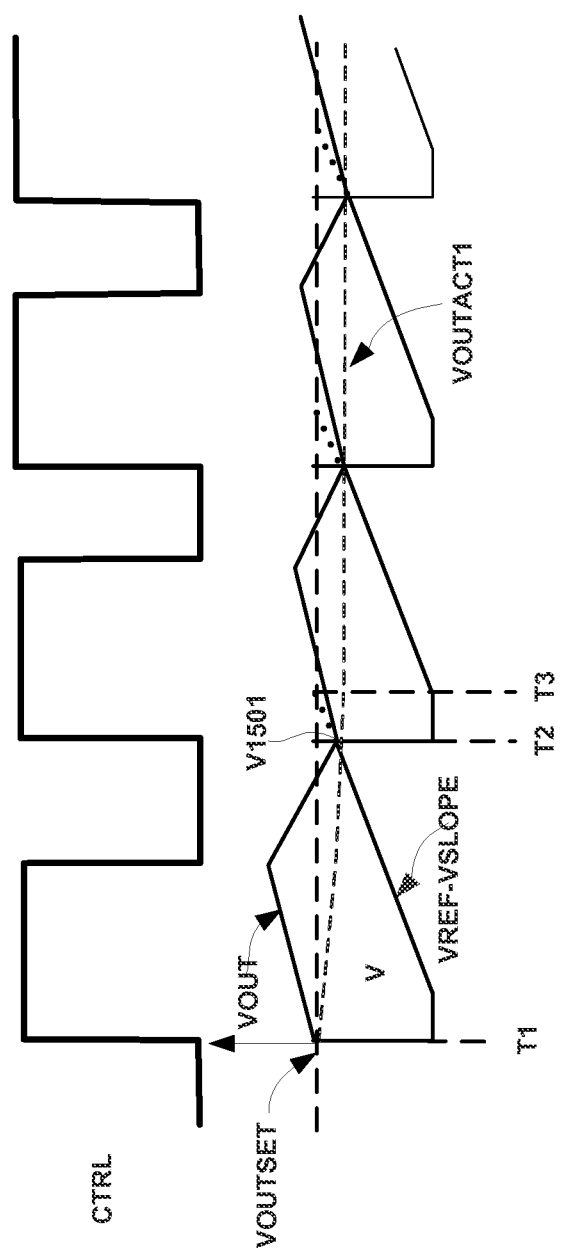
FIG. 15 shows operational waveforms of a prior art conventional converter when the input voltage VIN decreases or the load current increases.

FIG. 15 shows operational waveforms of the prior art switching converter when the input voltage VIN decreases. It is assumed that at time T1, the input voltage VIN begins to decreases. Then the OFF time of the power switch S1 would decrease for a higher duty cycle since the ON time is constant. For a prior art switching converter, the slope compensation signal VSLOPE does not change along with the input voltage VIN. At time T3, when the output voltage VOUT becomes smaller than the difference between the reference signal VREF and the slope compensation signal VSLOPE, the control signal CTRL is changed into logical high, the switch S1 is turned on and the switch S2 is turned off. At T2 time, the output voltage VOUT is equal to V1501 which is lower than the set output voltage VOUTSET. In the following period, the OFF time continuously decreases. Finally, the output voltage VOUT is stabilized at VOUTACT1 which is lower than the pre-set output voltage VOUTSET. As a result, the output voltage VOUT would be lower than desired value as the input voltage decreases. Similarly, once the load current IOUT of the switching converter increases, the output voltage VOUT may also show such trend on its waveform.

Figure 16:
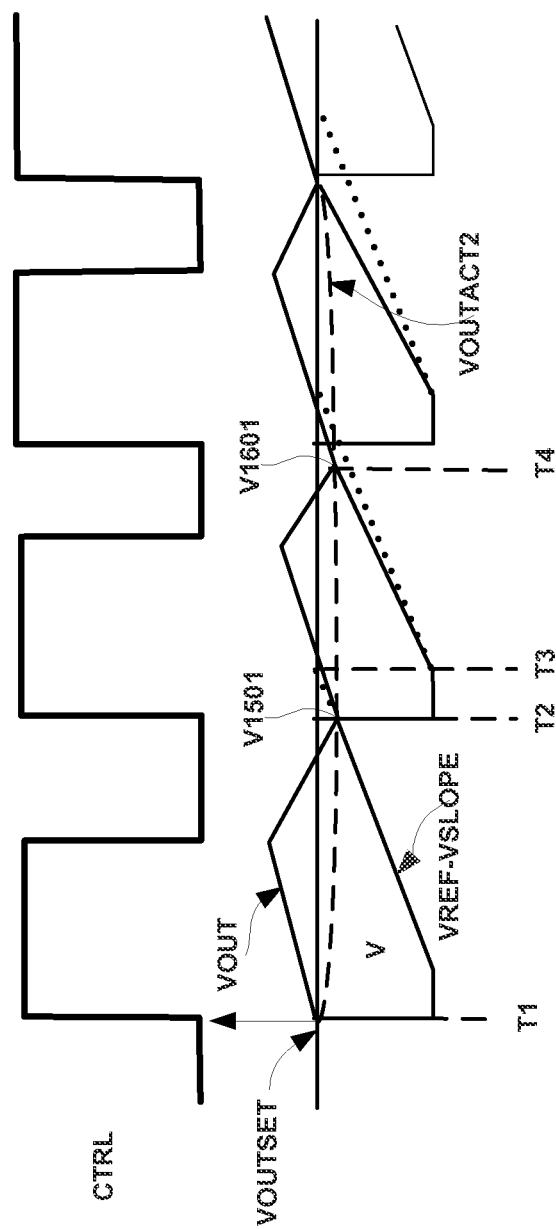
FIG. 16 shows operational waveforms of the switching converter 1200 when the input voltage VIN decreases or the load current increases.

FIG. 16 show operational waveforms of the switching converter 1200 when the input voltage VIN decreases in accordance with an embodiment of the present invention. It is assumed that at time T1, the input voltage VIN begins to decrease likewise. Then the OFF time decreases for a higher duty cycle since the ON time is constant. For the switching converter 1200, the slop of the slope compensation signal VSLOP increases if the OFF time decreases according to equation (6). At time T3, when the output voltage VOUT becomes lower than V1601, the switch S1 is turned on and the switch S2 is turned off. The V1601 will be larger than V1501 since the slope of the slop compensation signal VSLOPE has been increased. In the following period, the slope compensation circuit 1001 continuously adjusts the slope of the slope compensation signal VSLOPE. Finally, the output voltage VOUT is stabilized at VOUTACT2. VOUTACT2 maybe equal to or smaller than the pre-set output voltage VOUTSET, but it is higher than the VOUTACT1. So, the line regulation performance of the switching converter is improved. Similarly, when the load current of the switching converter 1200 gets larger, the OFF time would increased, and the slope compensation circuit 1001 could also adjust the slope of the slope compensation signal VSLOPE for a better load regulation.

In another embodiment, the slope compensation circuit 1001 could sense change on input voltage through detecting the switching period of the power switch S1. Once a decrease on the input voltage is detected, the slope compensation circuit increases the first current I1 such that the slope of the slope compensation signal VSLOPE could increase. In some embodiment, such as constant OFF time switching converters, the slope compensation circuit 1001 could sense a change on input voltage through detecting the ON time or the switching period of the power switch S1.

In one embodiment, the second voltage signal V2 shown in FIG. 2 could represent one or more of the following factors: the input voltage signal VIN; the output voltage signal VOUT; the load current IOUT; an on time TON of the power switch S1; and the off time TOFF of the power switch S1. Thus the slope of the slope compensation signal VSLOPE is allowed to be adjusted according to these factors to improve the performance of the transient response, the load regulation, or the line regulation of switching converters.

Slope compensation circuits and switching converters have been disclosed. While specific embodiments of the present invention have been provided in the above description, it should be understood that these embodiments are for illustration purposes and not intend to limit the present invention. Many additional embodiments will be apparent to persons of ordinary skill in the art under the spirit of the present invention.

I claim:

1. A slope compensation circuit, comprising:
a first voltage source, having a first terminal and a second terminal, wherein the first voltage source is configured to provide a first voltage signal;
a first operation circuit, having a first terminal, a second terminal and an output terminal, configured to provide a current control signal according to the first voltage signal and a second voltage signal;
a first switch, having a first terminal and a second terminal, wherein the first terminal of the first switch is coupled to the first terminal of the first voltage source;
a first capacitor, having a first terminal and a second terminal, wherein the first terminal of the first capacitor is coupled to the second terminal of the first switch, and wherein the second terminal of the first capacitor is coupled to the second terminal of the first voltage source;
a second switch, having a first terminal and a second terminal, wherein the first terminal of the second switch is coupled to the first terminal of the first capacitor; and
a first controlled current source, having a first terminal, a second terminal and a control terminal, wherein the first terminal of the first controlled current source is coupled to the second terminal of the second switch, and wherein the second terminal of the first controlled current source is coupled to the second terminal of the first capacitor, and wherein the control terminal of the first controlled current source is coupled to the output terminal of the first operation unit, and wherein the first controlled current source is configured to provide a first current signal according to the current control signal.

2. The slope compensation circuit of claim 1, wherein the slope compensation circuit is configured to provide an output signal from an input signal via turning ON and OFF a power switch in a switching converter, and wherein the second voltage signal is based on at least one of following factors: an input voltage of the switching converter; an output voltage of the switching converter; a load current of the switching converter; an ON time of the power switch; and an OFF time of the power switch.

3. The slope compensation circuit of claim 2, wherein the switching converter is a constant on-time step-down converter, and wherein the first controlled current increases if:
the input voltage decreases; or
the load current of the switching converter increases.

4. The slope compensation circuit of claim 1, wherein operation rules of the first operation unit comprises addition, subtraction, multiplication, division, integral or differential.

5. The slope compensation circuit of claim 1, wherein the first voltage source comprise:
a first resistor, having a first terminal and a second terminal, wherein the first terminal of the first resistor serves as the first terminal of the first voltage unit, and wherein the second terminal of the first resistor serves as the second terminal of the first voltage unit; and
a first current source, having a first terminal and a second terminal, wherein the first terminal of the first current source is coupled to the first terminal of the first resistor, and wherein the second terminal of the first current source is coupled to a power supply.

6. The slope compensation circuit of claim 1, wherein the slope compensation circuit further comprise a first detecting circuit, wherein the first detecting circuit has a first terminal coupled to the first terminal of the first voltage unit, a second terminal coupled to the second terminal of the first voltage unit, and an output terminal coupled to the first input terminal of the first operation unit configured to provide a first detecting signal, and wherein the first detecting signal is proportional to the first voltage signal.

7. The slope compensation circuit of claim 1, wherein the slope compensation circuit further comprise a second detecting circuit, wherein the second detecting circuit has an input terminal configured to receive a first status signal, and an output terminal configured to provide the second voltage signal, and wherein the second detecting circuit comprise:
a second current source, having a first terminal and a second terminal, the second current source being configured to provide a second current signal;

a third switch, having a first terminal and a second terminal, wherein the first terminal of the third switch is coupled to the first terminal of the second current source, and wherein the first status signal is configured to determine the ON and OFF operation of the third switch;

a second capacitor, having a first terminal and a second terminal, wherein the first terminal of the second capacitor is coupled to the second terminal of the third switch, and wherein the second terminal of the second capacitor is coupled to the second terminal of the second current source;

a fourth switch, having a first terminal and a second terminal, wherein the first terminal of the fourth switch is coupled to the first terminal of the second capacitor, and wherein the second terminal of the fourth switch is coupled to the second terminal of the second capacitor; and a sampling-hold circuit, having an input terminal and an output terminal, wherein the input terminal of the sampling-hold circuit is coupled to the first terminal of the second capacitor, and wherein the output terminal of the sampling-hold circuit provides the second voltage signal.

8. The slope compensation circuit of claim 7, wherein sampling-hold circuit is configured to detect a peak voltage across the second capacitor.

9. The slope compensation circuit of claim 1, wherein the slope compensation circuit further comprise a second detecting circuit, wherein the second detecting circuit has an input terminal to receive a first status signal, and an output terminal to provide the second voltage signal, and wherein the second detecting circuit comprise:

a second current source, having a first terminal, a second terminal and a control terminal, configured to provide a second current signal according to a third voltage;

a third switch, having a first terminal and a second terminal, wherein the first terminal of the third switch is coupled to the first terminal of the second current source, and wherein the first status signal is configured to determine the ON and OFF operation of the third switch;

a second capacitor, having a first terminal and a second terminal, wherein the first terminal of the second capacitor is coupled to the second terminal of the third switch, and wherein the second terminal of the second capacitor is coupled to the second terminal of the second current source;

a fourth switch, having a first terminal and a second terminal, wherein the first terminal of the fourth switch is coupled to the first terminal of the second capacitor, and wherein the second terminal of the fourth switch is coupled to the second terminal of the second capacitor;

a sampling-hold circuit, having an input terminal and an output terminal, wherein the input terminal of the sampling-hold circuit is coupled to the first terminal of the second capacitor, and wherein the output terminal of the sampling-hold circuit provides a sampling-hold signal; and a division circuit having a first terminal, a second terminal and an output terminal, wherein the first terminal of the division circuit is configured to receive the third voltage, wherein the second terminal of the division circuit is coupled to the output terminal of the sampling-hold circuit, and wherein the output terminal of the division circuit is configured to provide the second voltage signal according to the third voltage signal and the sampling-hold signal.

10. The slope compensation circuit of claim 9, wherein the division signal equals to a ratio of the third voltage signal to the sampling-hold signal; and wherein the current control signal equals to a product of the first voltage signal and the second voltage signal.

11. The slope compensation circuit of claim 9, wherein the division signal equals to a ratio of the sampling-hold voltage signal to the third signal; and wherein the current control signal equals to a ratio of the first voltage signal to the second voltage signal.

12. The slope compensation circuit of claim 9, wherein the first current signal is proportional to the current control signal.

13. The slope compensation circuit of claim 9, wherein the second current signal is proportional to the third voltage signal.

14. A switching converter, comprising:

a switching circuit, having an input terminal, an output terminal and at least one power switch, the switching circuit being configured to provide an output voltage;

an on-time control circuit configured to generate an on-time control signal;

a slope compensation circuit configured to generate a slope compensation signal, wherein the slope compensation circuit comprise:

a first voltage source, having a first terminal and a second terminal, wherein the first voltage source is configured to provide a first voltage signal;

a first operation circuit, having a first terminal, a second terminal and an output terminal, configured to provide a current control signal according to the first voltage signal and a second voltage signal;

a first switch, having a first terminal and a second terminal, wherein the first terminal of the first switch is coupled to the first terminal of the first voltage source;

a first capacitor, having a first terminal and a second terminal, wherein the first terminal of the first capacitor is coupled to the second terminal of the first switch, and wherein the second terminal of the first capacitor is coupled to the second terminal of the first voltage source;

a second switch, having a first terminal and a second terminal, wherein the first terminal of the second switch is coupled to the first terminal of the first capacitor;

a first controlled current source, having a first terminal, a second terminal and a control terminal, wherein the first terminal of the first controlled current source is coupled to the second terminal of the second switch, and wherein the second terminal of the first controlled current source is coupled to the second terminal of the first capacitor, and wherein the control terminal of the first controlled current source is coupled to the output terminal of the first operation unit, and wherein the first controlled current source is configured to provide a first current signal according to the current control signal;

a comparing circuit coupled to the slope compensation circuit and the switching circuit, wherein the comparing circuit generates a comparing signal according to the slope compensation signal, a reference signal and the output voltage of the switching circuit; and a logic circuit coupled to the on-time control circuit and the comparing circuit, wherein the logic circuit generates a control signal according to the on-time control signal and the comparing signal, and wherein the control signal determines the ON and OFF operation of the at least one power switch.

15. The switching converter of claim 14, wherein the switching circuit comprise:
   a first switch, having a first terminal, a second terminal and a control terminal, wherein the first terminal is coupled to the input terminal of the switching converter;
   a second switch having a first terminal, a second terminal and a control terminal, wherein the first terminal is coupled to the second terminal of the first switch, wherein the second terminal is coupled to a system ground, and wherein the control terminal is coupled to the output of the logic circuit;
   an inductor, having a first terminal and a second terminal, wherein the first terminal is coupled to the second terminal of the first switch; and
   an output capacitor, having a first terminal and a second terminal, wherein the first terminal is coupled to the second terminal of the inductor, wherein the second terminal is coupled to the system ground.

16. The switching converter of claim 14, wherein the comparing circuit comprises a comparator, and wherein the comparator comprises an inverting input, a non-inverting input and an output, wherein the inverting input receives the reference signal, and wherein the non-inverting input receives a sum of the slope compensation signal and the output voltage, and wherein the output provides the comparing signal.

17. The switching converter of claim 14, wherein the comparing circuit comprises a comparator, and wherein the comparator comprises an inverting input, a non-inverting input and an output, wherein the inverting input receives a difference between the voltage reference and the slope compensation signal, and wherein the non-inverting input receives the output voltage, and wherein the output provides the comparing signal.

18. A constant ON-time switching converter, comprising:
   a switching circuit, having an input terminal, an output terminal and at least one power switch, the switching circuit being configured to provide an output voltage;
   an on-time control circuit configured to generate an on-time control signal;
   a slope compensation circuit configured to generate a slope compensation signal according to an OFF time of the power switch, wherein a slope of the slope compensation signal increases, if:
      the input voltage decreases; or
      the load current of the switching converter increases;
   a comparing circuit coupled to the slope compensation circuit and the switching circuit, wherein the comparing circuit generates a comparing signal according to the slope compensation signal, a reference signal and the output voltage of the switching circuit; and
   a logic circuit coupled to the on-time control circuit and the comparing circuit, wherein the logic circuit generates a control signal based on the on-time control signal and the comparing signal, and wherein the control signal determines the ON and OFF operation of the at least one power switch.

19. The constant ON-time switching converter of claim 18, wherein the OFF time of the power switch decreases if:
   the input voltage decreases; or
   the load current of the switching converter increases.

20. The constant ON-time switching converter of claim 18, wherein the switching circuit comprise:
   a first switch having a first terminal, a second terminal and a control terminal, wherein the first terminal is coupled to the input terminal of the switching converter;
   a second switch, having a first terminal, a second terminal and a control terminal, wherein the first terminal is coupled to the second terminal of the first switch, wherein the second terminal is coupled to a system ground, and wherein the control terminal is coupled to the output of the logic circuit;
   an inductor, having a first terminal and a second terminal, wherein the first terminal is coupled to the second terminal of the first switch; and
   an output capacitor, having a first terminal and a second terminal, wherein the first terminal is coupled to the second terminal of the inductor, wherein the second terminal is coupled to the system ground.

* * * * *